No. 780,702. Patented January 24, 1905.

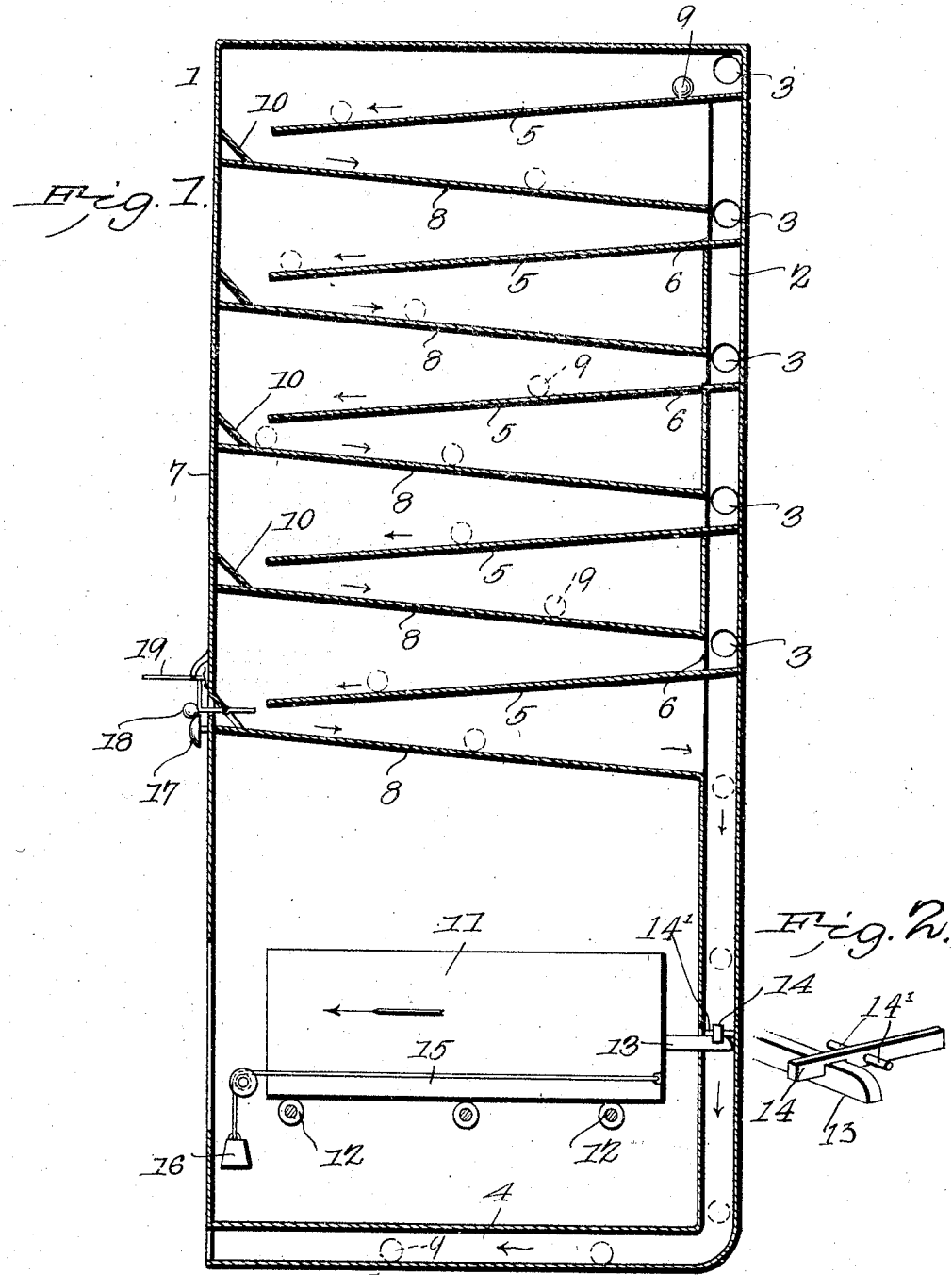

UNITED STATES PATENT OFFICE.

ARTHUR T. BRADSHAW, OF PHILADELPHIA, PENNSYLVANIA.

INDICATOR FOR DOMESTIC BOILERS, &c.

SPECIFICATION forming part of Letters Patent No. 780,702, dated January 24, 1905.

Application filed November 28, 1903. Serial No. 183,022.

*To all whom it may concern:*

Be it known that I, ARTHUR T. BRADSHAW, a citizen of the United States, residing at Philadelphia, in the county of Philadelphia and State of Pennsylvania, have invented a new and useful Indicator for Domestic Boilers, &c., of which the following is a specification.

My invention relates to that class of devices which are employed for cooking eggs, cereals, or the like and automatically checking the cooking process at the proper time, and has for its objects to produce a device of this character of simple construction which will be efficient in operation, one in which the food-container will be automatically released and withdrawn after its contents have cooked for a certain predetermined time, and one in which an audible alarm will be given and a visual signal or indicator actuated immediately before the termination of the cooking process.

To these ends the invention comprises the novel details of construction and combination of parts more fully hereinafter described.

In the accompanying drawings, Figure 1 is a view in sectional elevation of my improved device. Fig. 2 is a detail perspective view of the tripping mechanism.

Referring to the drawings, 1 indicates the frame, provided at one side with a primary vertically-disposed tubular guide or runway 2, which is provided with a series of lateral openings 3, spaced one above another and arranged at intervals along one of the walls of the guideway, which latter terminates at its lower end in a substantially horizontal portion or extension 4, the purpose of which will later appear.

5 indicates a series of superposed secondary guides or runways attached in the frame, with their inner ends extending through opening 6 in the side of the tubular guide 2 and closing the latter one directly beneath each of the openings 3. These guides 5, which terminate at their outer ends short of the adjacent side of the frame 1, are horizontally disposed, but slightly downwardly inclined from their inner toward their outer ends and alternated with similar guides or runways 8, which are attached at their inner ends to the side 7 of the frame and terminate at their outer ends adjacent to the openings 6 in the tubular guide 2, thus forming, in conjunction with the latter and the secondary guides 5, a practically continuous raceway upon which a suitable weighted or metal ball 9 is designed to travel for the purpose which will presently appear, the secondary guides 5 and 8 being grooved longitudinally to receive the ball and prevent its escape. Attached to the guide 8 and side 7 of the frame and adjacent to the point of termination of the guides 5 are slightly-inclined abutments 10, with which the ball 9 contacts as it leaves the guides 5 and by which it is properly directed onto and given an impetus down the guides 8.

11 indicates a food receptacle or container situated at the lower end of the frame 1 and sustained by horizontal guides or rollers 12. This receptacle, which may be of any suitable material and of the form herein shown or other desired form, is provided with a latch member 13, engaged by a keeper 14, one end of which extends into the tubular guide 2 within the path of the ball 9 when traveling in said guide, said keeper being provided with suitable trunnions or pintles 14', journaled in bearings in the adjacent walls of the tube 2 for pivotally sustaining the keeper. The receptacle 11 has attached thereto by cords or other flexible connection 15 one or more weights 16, which when the latch member 13 is released serves to automatically withdraw the receptacle from the influence of the boiling water or other cooking medium.

17 is an audible alarm, preferably in the form of a bell, carried by the frame and adapted to be sounded by a pivoted hammer 18, the inner end of which lies directly beneath the outer terminal of the lowermost runway 5 and in the path of the descending ball 9, whereby the latter will actuate the hammer for sounding the alarm and will at the same time actuate a visible signal or indicator 19. Thus if a number of the devices are in simultaneous operation the attendant may through the indicator 19 determine at a glance in which of the devices the alarm has been sounded.

In practice the ball 9 is inserted through one of the openings 3 and travels downward upon the guides until it strikes upon and releases the keeper 14, permitting the weights 16 to actuate the receptacle in the manner and for the purpose heretofore explained, it being understood in this connection that the length of time required for the ball to reach and actuate the keeper is predetermined by the opening through which it is inserted and that the ball will just prior to releasing the keeper actuate the alarm and signal in the manner heretofore described. Thus if the ball is inserted through the uppermost opening five minutes will be required for it to travel to and release the receptacle, while from the next opening will require four minutes, and so on, it being understood, of course, that this time may be varied according to the size of the device and the inclination of the guides 5 and 8.

From the foregoing it will be seen that I produce a device of simple construction which is admirably adapted for the attainment of the ends in view; but it is to be understood that I do not limit or confine myself to the precise details herein set forth, inasmuch as minor changes may be made therein without departing from the spirit or scope of the invention.

Having thus described my invention, what I claim is—

1. In a device of the class described, the combination with an inclined track, of an automatically-movable receptacle sustained adjacent thereto, means for locking the receptacle in cooking position, a device free from engagement with and traveling on the track for actuating the means to release the receptacle, and means whereby the device may travel different distances.

2. In a device of the class described, the combination with an inclined track, of an automatically-movable receptacle sustained adjacent thereto, means for locking the receptacle in cooking position, an alarm, a device traveling on the track for actuating the alarm and operating the means to release the receptacle, and means whereby the device may travel different distances.

In testimony that I claim the foregoing as my own I have hereto affixed my signature in the presence of two witnesses.

ARTHUR T. BRADSHAW.

Witnesses:
  FRED W. WHIPPLE,
  M. P. WHIPPLE.